US008508655B2

(12) United States Patent
Suto

(10) Patent No.: US 8,508,655 B2
(45) Date of Patent: Aug. 13, 2013

(54) LENS APPARATUS, IMAGE CAPTURE APPARATUS, AND METHOD FOR CORRECTING IMAGE QUALITY

(75) Inventor: Hidekazu Suto, Tokyo (JP)

(73) Assignee: Sony Corporation (JP)

( * ) Notice: Subject to any disclaimer, the term of this patent is extended or adjusted under 35 U.S.C. 154(b) by 271 days.

(21) Appl. No.: 11/974,690

(22) Filed: Oct. 15, 2007

(65) Prior Publication Data

US 2009/0009633 A1    Jan. 8, 2009

(30) Foreign Application Priority Data

Oct. 16, 2006 (JP) ................................ P2006-281611

(51) Int. Cl.
*H04N 5/225* (2006.01)
(52) U.S. Cl.
USPC ............................ 348/360; 348/241; 348/340
(58) Field of Classification Search
USPC ................................ 348/241, 340, 360; 396/71
See application file for complete search history.

(56) References Cited

U.S. PATENT DOCUMENTS

| 5,227,832 | A * | 7/1993 | Kawasaki et al. ............... 396/81 |
| 7,477,290 | B2 * | 1/2009 | Okada ............................ 348/208.6 |
| 2002/0041383 | A1 | 4/2002 | Lewis et al. |
| 2004/0212696 | A1 * | 10/2004 | Tsugita et al. ............... 348/231.6 |
| 2005/0158044 | A1 * | 7/2005 | Ide et al. ........................... 396/71 |
| 2005/0261058 | A1 * | 11/2005 | Nguyen et al. ................. 463/40 |
| 2007/0211154 | A1 * | 9/2007 | Mahmoud et al. ............ 348/251 |
| 2009/0147110 | A1 * | 6/2009 | Muramatsu et al. .......... 348/255 |

FOREIGN PATENT DOCUMENTS

| JP | 02284591 A | 11/1990 |
| JP | 04256917 A | 9/1992 |
| JP | 11161773 A | 6/1999 |
| JP | 11164194 A | 6/1999 |
| JP | 2000-003437 A | 1/2000 |
| JP | 2002207242 A | 7/2002 |
| JP | 2005184090 A | 7/2005 |
| JP | 2006050019 A | 2/2006 |
| JP | 2006074401 A | 3/2006 |
| JP | 2006148213 A * | 6/2006 |
| JP | 2006148353 A | 6/2006 |
| JP | 2006215398 A | 8/2006 |

OTHER PUBLICATIONS

European Search Report 07254098, dated Mar. 17, 2010.
Office Action from Japanese Application No. 2006-281611, dated Dec. 13, 2011.
Office Action from Japanese Application No. 2006-281611, dated Mar. 6, 2012.

* cited by examiner

*Primary Examiner* — Roberto Velez
*Assistant Examiner* — Yih-Sien Kao
(74) *Attorney, Agent, or Firm* — Lerner, David, Littenberg, Krumholz & Mentlik, LLP

(57) ABSTRACT

An image capture apparatus on which a lens apparatus is detachably mounted, may include an image capture device, an image-signal processor, a communication unit, and a control unit. The image capture device may generate an image signal obtained by photoelectric conversion of subject light forming an image through a lens of the image capture apparatus. The image-signal processor may carry out image processing on the image signal photo-electrically converted by the image capture device. The communication unit may communicate with the lens apparatus. The control unit may carry out control to receive the correction information for lateral chromatic aberration and/or the correction information for light falloff at edges through the communication unit. The image-signal processor may correct image degradation caused by the aberration of the lens using the correction information for lateral chromatic aberration and/or the correction information for light falloff at edges, which are received through the communication unit.

8 Claims, 10 Drawing Sheets

| Lens Status 1 | A |
|---|---|
| | B |
| | C |
| | D |
| | A´ |
| | B´ |
| | C´ |
| | D´ |

FIG. 5A

| Lens Status 2 | A |
|---|---|
| | B |
| | C |
| | D |

| Iris | Focus | Zoom | Data |
|---|---|---|---|
| IRIS[0] | FOCUS[0] | ZOOM[0] | A |
| | | | B |
| | | | C |
| | | | D |
| | | | A´ |
| | | | B´ |
| | | | C´ |
| | | | D´ |
| | | ZOOM[1] | A |
| | | | B |
| | | | C |
| | | | D |
| | | | A´ |
| | | | B´ |
| | | | C´ |
| | | | D´ |
| | | ⋮ | A |
| | | | B |
| | | | C |
| | | | D |
| | | | A´ |
| | | | B´ |
| | | | C´ |
| | | | D´ |
| | | ZOOM[xx] | A |
| | | | B |
| | | | C |
| | | | D |
| | | | A´ |
| | | | B´ |
| | | | C´ |
| | | | D´ |
| | FOCUS[1] | ZOOM[0] | A |
| | | | B |
| | | | C |
| | | | D |
| | | | A´ |
| | | | B´ |
| | | | C´ |
| | | | D´ |

FIG. 8

| 1byte | 1byte | 0~15byte | 1byte |
|---|---|---|---|
| Command | Function | Function Data (Variable Length) | Checksum |

LENS APPARATUS, IMAGE CAPTURE APPARATUS, AND METHOD FOR CORRECTING IMAGE QUALITY

CROSS-REFERENCE TO RELATED APPLICATIONS

This application claims priority from Japanese Patent Application No. JP 2006-281611 filed in the Japanese Patent Office on Oct. 16, 2006, the entire content of which is incorporated herein by reference.

BACKGROUND OF THE INVENTION

1. Field of the Invention

The present invention relates to an image capture apparatus suitably applied to a video camera or the like, a lens apparatus to be mounted on such an image capture apparatus, and a method for correcting image quality.

2. Description of the Related Art

In general, optical lenses may cause a phenomenon called aberration, which causes an unfavorable colored portion, an out of focus, and an image distortion when an image is formed. For example, one kind of aberration is known as a lateral chromatic aberration (chromatic aberration of magnification) by which a blur occurs on the boundary area of a subject image. The lateral chromatic aberration is caused such that, when an image is formed, rays of red (R), green (G), and blue (B) passed through a lens have focal positions varied in the direction perpendicular to an optical axis depending on wavelengths. FIG. 1 illustrates an appearance of an image formation, in which rays of R, G, and B passed through a lens have focal positions varied in the direction perpendicular to an optical axis. A degree of displacement varies depending on characteristics of a lens and a zoom position, focus position and iris condition of an image capture apparatus using such lens. FIG. 2 shows an example representing a relationship between an amount of displacement of focal positions and the zoom setting.

In FIG. 2, the vertical axis represents an amount of displacement in focal positions and the horizontal axis represents a zoom position (from wide to telescopic views). In FIG. 2, the focal position of G is used as a standard. Displacements of R and B are relatively represented with reference to G. In particular, a video camera used for shooting television programs may require a decrease in lateral chromatic aberration because it appears as a varied registration error.

A lens material such as fluorite which shows stable optical performance without a difference in focal lengths over the broad range of wavelengths may be used for reducing the lateral chromatic aberration, for example. On the other hand, the reduction of aberration can also be expected by the use of a combination of lenses made of materials with different refractive indexes. However, fluorite is expensive. If fluorite is used, production costs may increase as a result. Similarly, in the case of combining a plurality of lenses, production costs may increase all the same. Thus, a technique has been devised to correct the lateral chromatic aberration by carrying out image signal processing on digital image data captured by an image capture apparatus.

In addition to the aberration, a phenomenon of light falloff at edges, which causes an image degradation attributed to characteristics of a lens, has also been known. The "light falloff at edges" is a phenomenon in which an amount of light at the edges of a screen falls compared with the center thereof. Such a phenomenon may be caused by obstructing part of peripheral rays with a lens barrel. The degree of light falloff varies extensively depending on the zoom setting and focus and iris conditions of an image capture apparatus using the lens. FIGS. 3A and 3B are graphical representations respectively showing an example of a light intensity ratio of the center to the periphery of the lens under each state of normal or wide angle of view. In FIGS. 3A and 3B, the light intensities (%) are plotted on the vertical axis and the locations from the center to the corner are plotted on the horizontal axis. In each figure, two curves are represented. A lower curve is one obtained when the iris position is set to full-aperture and an upper curve is one obtained when the iris is narrowed.

FIG. 3A is a graphical representation of a light intensity ratio of the center to the corner of the screen when the zoom is set to a wide angle. FIG. 3B is a graphical representation of a light intensity ratio of the center to corner of the screen when the zoom is set to normal. The common phenomenon in both FIGS. 3A and 3B is that the larger the iris opens the more the light intensity of the periphery (corners) of the screen drops compared with that of the center thereof. In addition, as shown in FIGS. 3A and 3B, the reduction of the light intensity also varies with the state of the zoom position. The light falloff at edges can be prevented by enlarging the diameter of the lens. Alternatively, similarly to the correction to the lateral chromatic aberration, the light falloff at edges may be corrected by carrying out image signal processing on digital data obtained by shooting.

Japanese Unexamined Patent Application Publication No. 2000-3437 (JP 2000-3437 A) discloses the correction of a decrease in image quality attributed to the aberration of a lens with respect to digital image data obtained by a digital camera.

SUMMARY OF THE INVENTION

Video cameras, in particular, used for shooting television programs and so on typically use interchangeable lenses. However, an image capture apparatus, such as a video camera using an interchangeable lens, may need to prepare correction data for each model of the lens if the lateral chromatic aberration is corrected and the light falloff at edges is corrected. In addition, since moving images are captured, the correction should be carried out in real time. However, a technique for the real-time correction has not been devised for a video camera using such interchangeable lens.

It is desirable to correct an image degradation attributed to aberration of a lens in real time in an image capture apparatus including a lens, such as an interchangeable lens, detachably mounted thereto.

According to an embodiment of the present invention, there is provided an image capture apparatus on which a lens apparatus is detachably mounted. In the case of correcting the aberration of a lens, the lens apparatus may store correction information for lateral chromatic aberration and correction information for light falloff at edges, which are characteristic information about the aberration of the lens. The image capture apparatus may communicate with the lens apparatus when the image capture apparatus is powered on, when the lens apparatus is attached to the image capture apparatus for the first time, or when the lens apparatus is replaced. As a result, the image capture apparatus may receive the correction information for lateral chromatic aberration and the correction information for light falloff at edges stored in the lens apparatus. Subsequently, the received correction information may be used to correct both the lateral chromatic aberration and the correct light falloff at edges, which are attributed to the lens.

Since the image capture apparatus and the lens apparatus may be configured as described above, when the image capture apparatus is powered on, when the lens apparatus is attached to the image capture apparatus for the first time, or when the lens apparatus is replaced, correction information for lateral chromatic aberration and correction information for light falloff at edges may be transmitted to the image capture apparatus. Thus, at the time of correction, the required information may be read out in the image capture apparatus in each case and a real-time correction can be then carried out.

According to another embodiment of the present invention, there is provided an image capture apparatus on which a lens apparatus is detachably mounted. The lens apparatus may store correction information for lateral chromatic aberration and correction information for light falloff at edges, which are characteristic information about aberration of the lens. The image capture apparatus may communicate with the lens apparatus to read out the correction information for lateral chromatic aberration and the correction information for light falloff at edges which are stored in the lens apparatus at timing of once a field (indicating vertical scanning of a video signal, e.g., 1/60 sec). Then, the read-out correction information may be used to carry out the correction of lateral chromatic aberration and the correction of light falloff at edges, which are attributed to the lens.

Since the image capture apparatus and the lens apparatus may be configured as described above, the correction information for lateral chromatic aberration and the correction information for light falloff at edges may be transmitted from the lens apparatus in each case at timing of once a field. Therefore, the read-out correction information about the lens may be used in real-time correction.

According to embodiments of the present invention, an image capture apparatus on which a lens, such as an interchangeable lens, is detachably mounted may carry out the real-time correction of image degradation attributed to the lens.

BRIEF DESCRIPTION OF THE DRAWINGS

FIGS. 5A and 5B are explanatory diagrams illustrating an exemplified configuration of coefficient data of optical correction data according to an embodiment of the present invention.

FIG. 6 is an explanatory diagram illustrating an exemplified configuration of optical correction data according to an embodiment of the present invention.

FIG. 8 is an explanatory diagram illustrating an example of data formant at the time of communication according to an embodiment of the present invention.

DETAILED DESCRIPTION

Hereinafter, embodiments of the present invention will be described with reference to FIGS. 4 to 11.

Figure 1:
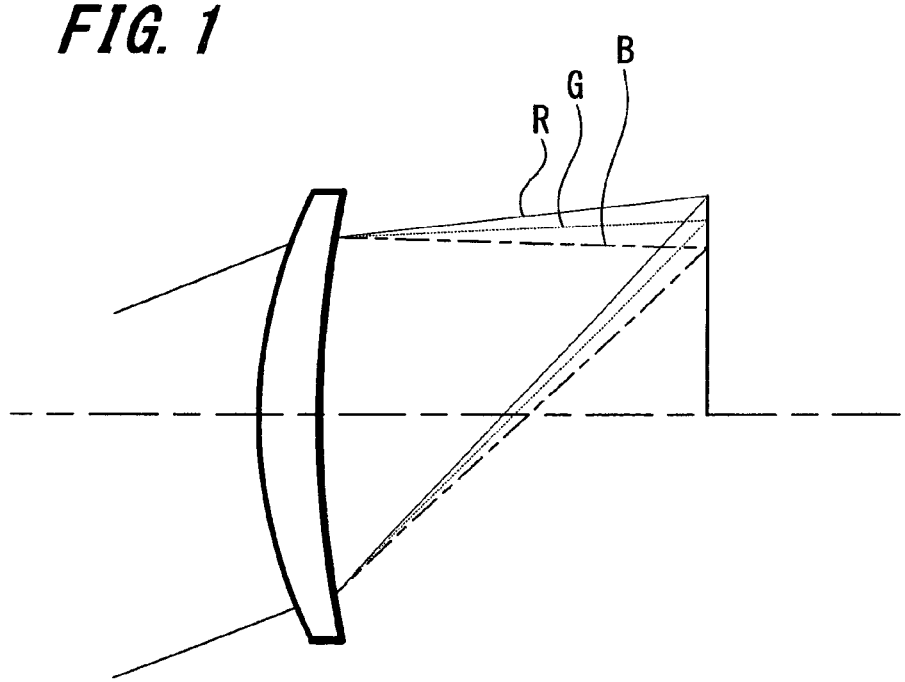
FIG. 1 is a graphical representation indicating an amount of displacement in focal positions of respective colors on lateral chromatic aberration.
Figure 2:
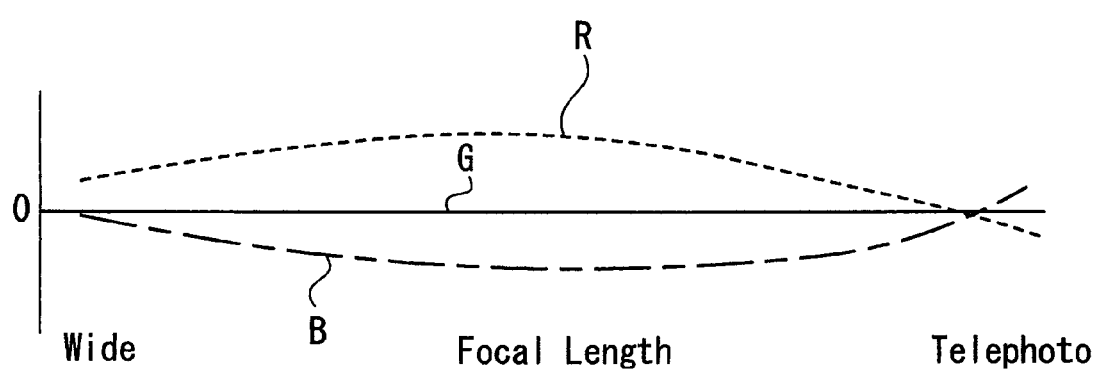
FIG. 2 is a graphical representation of the relationship between a lateral chromatic aberration and a focal length.
Figure 3A:
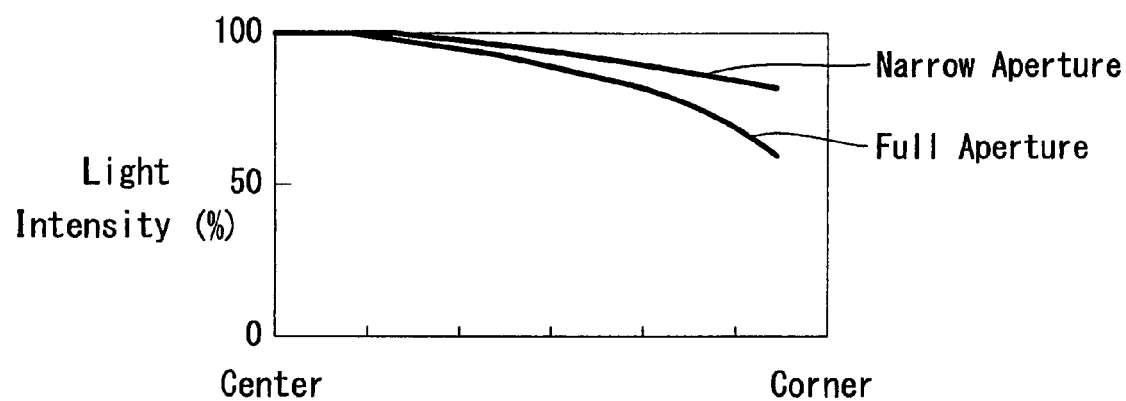
FIGS. 3A and 3B are graphical representations of a light intensity ratio of the center to the periphery of the lens under each state of normal and wide field of view.
Figure 3B:
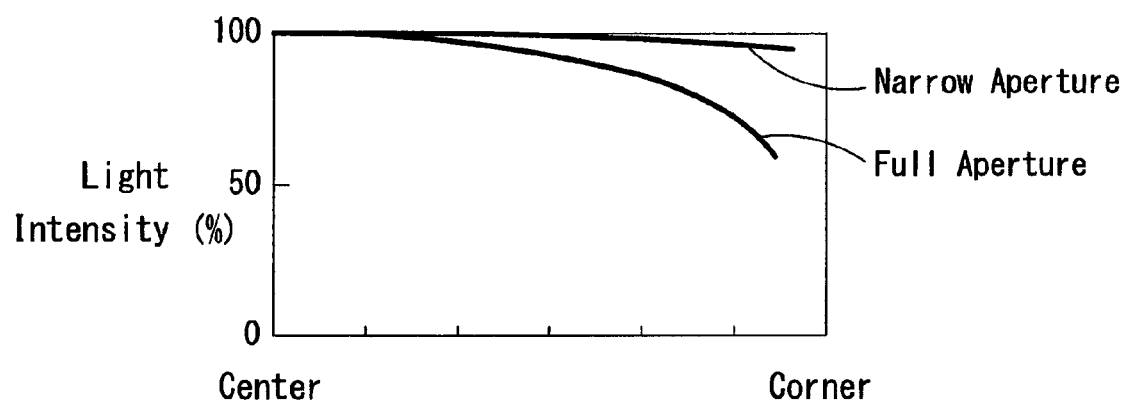
Figure 4:
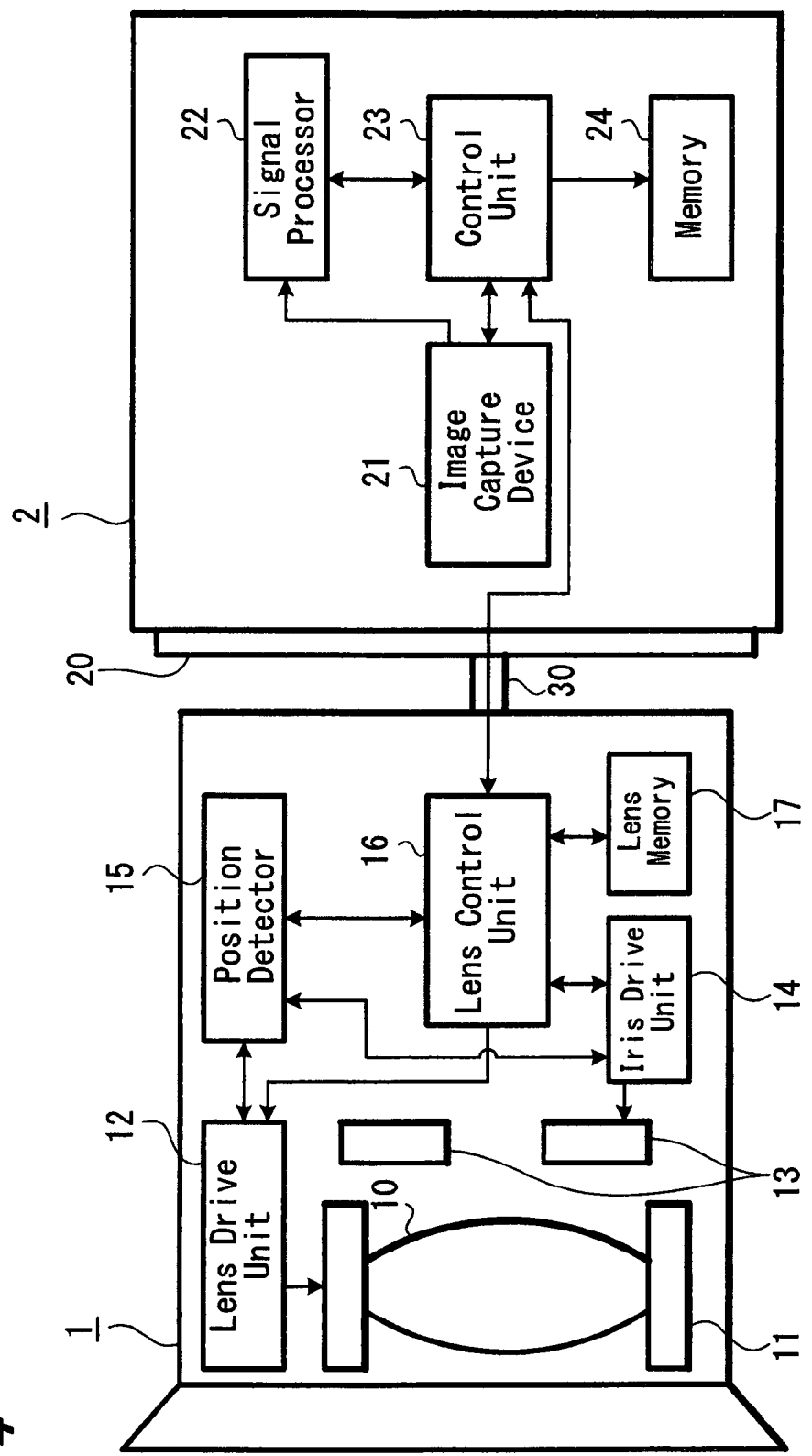
FIG. 4 is a block diagram illustrating an exemplified inner configuration of a video camera according to an embodiment of the present invention.

FIG. 4 shows an exemplified configuration of a video camera as an example of an image capture apparatus according to a first embodiment of the present invention. As shown in FIG. 1, a video camera 100 includes a lens unit 1 and a camera unit 2. The lens unit 1 is an interchangeable lens and designed to be detachably mounted on the camera unit 2 through a lens mount 20. The camera unit 2 provides the lens unit 1 with instructions or the like for changing the zoom setting and the focal position. Such a data communication between the lens unit 1 and the camera unit 2 can be carried out through a communication line 30 in a state that the lens unit 1 is being attached on the camera unit 2.

The lens unit 1 shown in FIG. 4 includes a lens group 10, a lens drive mechanism 11, a lens drive unit 12, an iris 13, an iris drive unit 14, a position detector 15, a lens control unit 16, and a lens memory 17. That is, the lens group 10 includes an image-capture lens, a focus lens for focusing a subject image on an imaging area, and a zoom lens for changing a focal length by changing the distance between the lenses (each of the lenses not shown in the figure). The lens drive mechanism 11 shifts the position of each lens of the lens group 10 in the optical axis direction. The lens drive unit 12 controls the movement of the lens drive mechanism 11. The iris 13 adjusts the light intensity of light incident on the lens group 10. The iris drive unit 14 actuates the iris 13. The position detector 15 detects the position of each lens of the lens group 10. The lens control unit 16 controls the actuation of each lens. The lens memory 17 stores the position of each lens detected by the position detector 15, and so on. In this embodiment, optical correction data, such as correction data for lateral chromatic aberration and correction data for light falloff at edges, can be stored in the lens memory 17 for each kind of lens, while the information can be read out by the camera unit 2 as necessary to carry out optical correction. Optical correction data is unique to each lens and the details of which will be described later.

Iris-position information, focus-position information, and zoom-position information, which are the information necessary for the correction of the lateral chromatic aberration and the light falloff at edges can be detected by the position detector 15 at any time and stored as detected signals in the lens memory 17, respectively.

The lens control unit 16 includes a lens CPU and so on and generates control signals in response to commands from a control unit of the camera unit 2 as described later, followed by supplying the control signals to the lens drive unit 12 and the iris drive unit 14. In addition, the lens control unit 16 responds to requests of transferring various kinds of information (e.g., information about zoom position, focus position, and iris position) and then transfers information corresponding to the requests to the camera unit 2 through the communication line 30. The lens drive unit 12 is a drive circuit for driving the lens drive mechanism 11. The lens drive unit 12 is controlled upon receiving a control signal input from the lens control unit 16. The iris drive unit 14 is a drive circuit for providing an iris drive mechanism (not shown) with a control signal, where the iris drive mechanism is provided for opening and closing the iris. The iris drive unit 14 is also driven under the control of the lens control unit 16.

The camera unit 2 includes the lens mount 20, an image capture device 21, a signal processor 22, a control unit 23, a memory 24, and so on. The lens mount 20 is a junction of the camera unit 2 with the lens unit 1. The image capture device 21 is provided for generating a captured image signal by photoelectrical conversion of the captured image light of the subject incident through the lens group 10 of the lens unit 1. The signal processor 22 is provided for carrying out the image signal processing on the captured image signal output from the image capture device 21. The control unit 23 is provided for controlling each part of the camera unit 2. The memory 24 is provided for storing the captured image signal subjected to the image processing in the signal processor 22, and so on.

Subject light incident through the lens group 10 of the lens unit 1 forms an image in a light-receiving surface (not shown) of the image capture device 21 and then photo-electrically converted into a captured image signal. Subsequently, the captured image signal output from the image capture device 21 is subjected to the removal of a reset noise and the adjustment of a signal level in an analog signal processor (not shown). The captured image signal is converted into a digital signal in an analog/digital converter (not shown). The captured image signal, which has been converted into the digital signal in the analog/digital converter, is then supplied to the signal processor 22. After that, the signal processor 22 carries out the image signal processing on the captured image signal. The signal processor 22 carries out knee correction that compresses a predetermined level or more of the image signal, γ correction for correcting the level of the image signal based on a predetermined γ curve, white-clip processing for adjusting the signal level of an image signal within a predetermined range and so on. In addition, the correction of lateral chromatic aberration and the collection of light falloff at edges may also be carried out.

The signal processor 22 of the camera unit 2 carries out the correction of lateral chromatic aberration and the correction of light falloff at edges on the basis of optical correction data stored in the lens memory 17 of the lens unit 1. The optical correction data stored in the lens memory 17 is arranged so as to be read into the memory 24 of the camera unit 2 when the correction is carried out in the signal processor 22. The reading of the data may be carried out as a part of the initialization process when the video camera 100 is powered on, the lens unit 1 is attached on the camera unit 2 for the first time, or the lens unit 1 is replaced. Alternatively, the reading may be carried out after inquiring the data of the lens unit side every time the correction is carried out. In any case, the camera unit 2 acquires the optical correction data retained in the lens unit by the communication through the communication line 30.

Next, a method of calculating optical correction data and a method of preparing a data table will be described. The optical correction data can be represented by a general polynomial of degree n. For example, in the case of expressing with a polynomial of degree 3, the number of coefficients thereof is four ("n+1"). As the lateral chromatic aberration is represented by an amount of displacement (i.e., the shift of R or B with reference to G), the optical correction data is calculated for each of R-G and R-B. In the following equations, four coefficients in the 3-degree polynomial are represented by A to D, respectively:

$$y = Ax^3 + Bx^2 + Cx + D \qquad R\text{-}G$$

$$y = A'x^3 + B'x^2 + C'x + D' \qquad B\text{-}G$$

The correction equation of the light falloff at edges can also be obtained in the same way:

$$y = Ax^3 + Bx^2 + Cx + D$$

Note that in the present embodiment, the correction equation is expressed by 3-degree polynomials. Alternatively, however, the correction equation may be expressed a polygonal of degree n, for example one of degree 4, 5, or more.

The optical correction data thus obtained may be provided in a table format as illustrated in FIGS. 5A and 5B and then stored in the lens memory 17 as a structure. FIG. 5A illustrates an example of the correction data structure of lateral chromatic aberration. Members of the structure include eight different coefficients (A to D and A' to D') of the correction data for lateral chromatic aberration. FIG. 5B illustrates an example of the correction data structure of light falloff at edges. Members of the structure include four different coefficients (A to D) of the correction data of light falloff at edges. Each of the degree of the lateral chromatic aberration and the degree of the light falloff at edges varies with an iris position, a focus position, and a zoom position. Thus, it may be required to prepare the optical correction data corresponding to the iris position, focus position, and zoom position, respectively. Therefore, a data array is provided as a three-dimensional array of [iris position], [focus position], and [zoom position]. For representing the three-dimensional array, each position of the iris, each position of the focus, and each position of the zoom are applied to the structural members in the array.

For example, the iris position has two types of "full-aperture" and "F4"; the focus position has four types of "INF (infinity)", "3 m", "1.5 m", and "0.8 m", and the zoom position has ten types of "Wide", "1.4 x", "1.8 x", "2.5 x", "3.6 x", "4.6 x", "6.2 x", "8.4 x", "9.8 x", and "Tele". In this case, each value may be assigned in order to the members of the structure represented by IRIS [0] to [xx], FOCUS [0] to [yy], ZOOM [0] to [zz], and so on. For example, in the case of the iris position, the assignment may be IRIS [0]=Full-aperture, IRIS [1]=F4, but no assignment in any of IRIS [2] to [xx].

FIG. 6 shows an example of the configuration of the three-dimensional array. In other words, FIG. 6 is an example of the configuration of the correction data for lateral chromatic aberration, where a three-dimensional array of [iris position], [focus position], and [zoom position] is represented in matrix. FIG. 6 represents optical correction data at the whole zoom positions (ZOOM [0] to [xx]) when the iris position is Full-aperture (IRIS [0]) and the focus position is Infinity (FOCUS [0]). FIG. 6 also represents optical correction data when the iris position is Full-aperture (IRIS [0]), the focus position is 1.4 x (FOCUS [1]), and the zoom position is Wide (ZOOM [0]).

Thus, the optical correction data is prepared as a table of the three-dimensional array to allow every combination of the iris position, the focus position, and the zoom position to be specified in the array. For example, if the correction data when the iris position is F4, the focus position is 1.5 m, and the zoom position is 2.5 x is acquired, the intended optical correction data can be obtained by specifying [2nd iris (IRIS [1])], [3rd Focus (FOCUS [2]), and [4th Zoom (ZOOM [3])].

Figure 7:
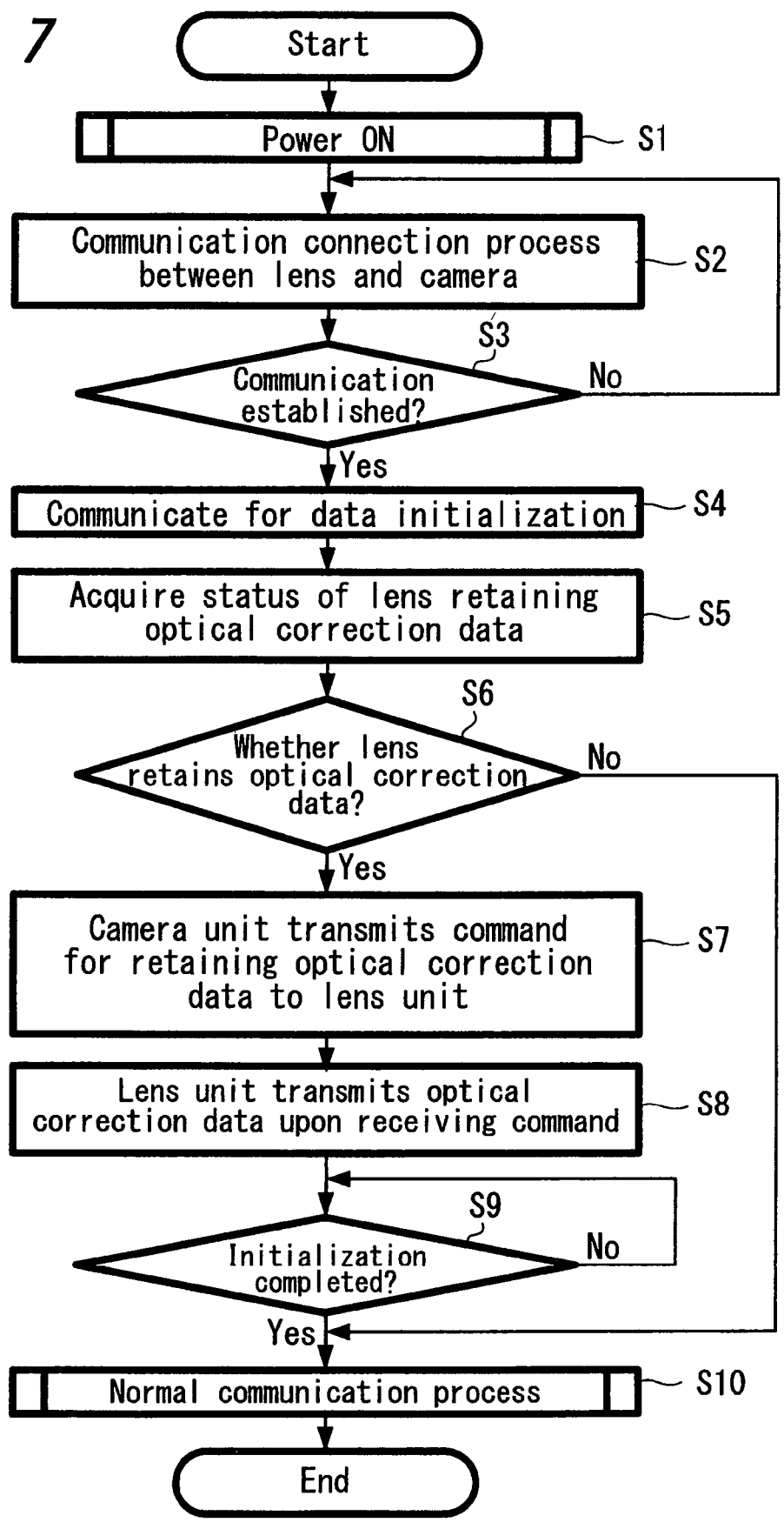
FIG. 7 is a flowchart illustrating a process example for acquiring optical correction data during an initialization process according to an embodiment of the present invention.

Next, referring to the flowchart of FIG. 7, a process example, in which the camera unit 2 reads out the optical correction data stored in the lens memory 17 of the lens unit 1, will be described. FIG. 7 illustrates an example of the process when the lens unit 1 is attached to the camera unit 2 for the first time. Whether the lens unit 1 is the first lens to be attached may be determined such that the camera unit 2 confirms the lens name of the lens unit 1 when the lens unit 1 is attached to the camera unit 2.

First, when the video camera 100 is powered on (Step S1), the process of communication connection between the lens unit 1 and the camera unit 2 is carried out (Step S2). The details of such a process of communication connection between the lens unit 1 and the camera unit 2 will be described later. Subsequently, whether the communication is established at the process of communication connection between the lens unit 1 and the camera unit 2 is determined (Step S3). During the period of no communication established, the process of communication connection at Step S2 is carried out. When it is determined that the communication is established, the communication for data initialization is carried out between the lens unit 1 and the camera unit 2 (Step S4). In the communication for data initialization, the lens unit 1 may transmit the characteristic information of the lens, such as the lens name and manufacturer name, to the camera unit 2. Alternatively, data requiring initialization may be transmitted and received between the lens unit 1 and the camera unit 2.

Next, the camera unit 2 obtains the status of the lens retaining the optical correction data from the lens unit 1 (Step S5) and then determines whether the lens unit 1 is the lens retaining the optical correction data (Step S6). If it is determined that the lens unit 1 is the lens not retaining the optical correction data, then the process proceeds to Step S10 and a normal communication process is carried out. The details of the process of determining whether the lens unit 1 is the lens retaining the optical correction data will be described later. If it is determined that the lens unit 1 is the lens retaining the optical correction data, then the control unit 23 of the camera unit 2 transmits a command that requests the acquisition of the optical correction data to the lens unit 1 (Step S7). When the lens control unit 16 of the lens unit 1 receives the command transmitted from the camera unit side, then optical correction data stored in the lens memory 17 is transmitted to the camera unit side (Step S8). At the time of completing the transmission of the optical correction data, it is determined whether the initialization process is completed (Step S9). The initialization process is continued until the completion of the initialization process is determined. If it is determined that the initialization process is completed, then the normal communication process is carried out (Step S10).

Here, the flowchart of FIG. 7 represents an exemplified process for obtaining the optical correction data when power is on. In this example, in the case of replacing the lens unit 1 with another one while power being powered on, the same process will be conducted.

Next, the details of the procedures in the respective steps described in the flowchart of FIG. 7 will be described with reference to FIGS. 8 and 9. First, referring now to FIG. 8, an example of the format of the command or response data, which can be received and transmitted between the camera unit 2 and the lens unit 1, will be described. As shown in FIG. 8, the data received and transmitted between the camera unit 2 and the lens unit 1 contains command (1 byte), function (1 byte), function data (0 to 15 bytes, variable in length), and checksum (1 byte). Four bits at the top of 1 byte of the command represents the main class of the command. The bits "0000" corresponds to a camera command, "1111" corresponds to a lens-maker user command, and "0001 to 1110" corresponds to reservation. In addition, four bits at the end of 1 byte of the command represents the data length of function data described later.

The function is a code that indicates data actually exchanged between the lens unit 1 and the camera unit 2, such as the request and response of F number and the request and response of serial number, and represented by "01", or the like.

The checksum is provided for inspecting whether an error occurs in data transmitted between the lens unit 1 and the camera unit 2. The checksum is provided with a value that gives a total value of 0 (zero) from the command to the checksum. The total of data row sent from the receiving side is calculated. There is no error or lack of data in the received data row when the total is 0 (zero). By having provided the checksum, it can be checked whether all data has been transmitted without fail.

Referring again to the flowchart of FIG. 7, the determination of whether the lens unit 1 is a lens that retains optical correction data, which is carried out in Step S5, can be carried out by obtaining and securing a flag on the side of the camera unit 2. Here, the flag indicates whether the lens unit 1 is a lens that retains optical correction data. In other words, the camera unit 2 transmits a command with the frame construction as shown in FIG. 8 to the lens unit 1 for making an inquiry about the flag. If there is no response from the lens unit 1, then it is determined that the lens does not retain the optical correction data.

Next, the acquisition of a lens status of retaining the optical correction data at the camera unit 2 from the lens unit 1 (Step S5) and the details of the process of the determination (Step S6) as described in FIG. 7 will be described with reference to FIG. 9.

Figure 9:
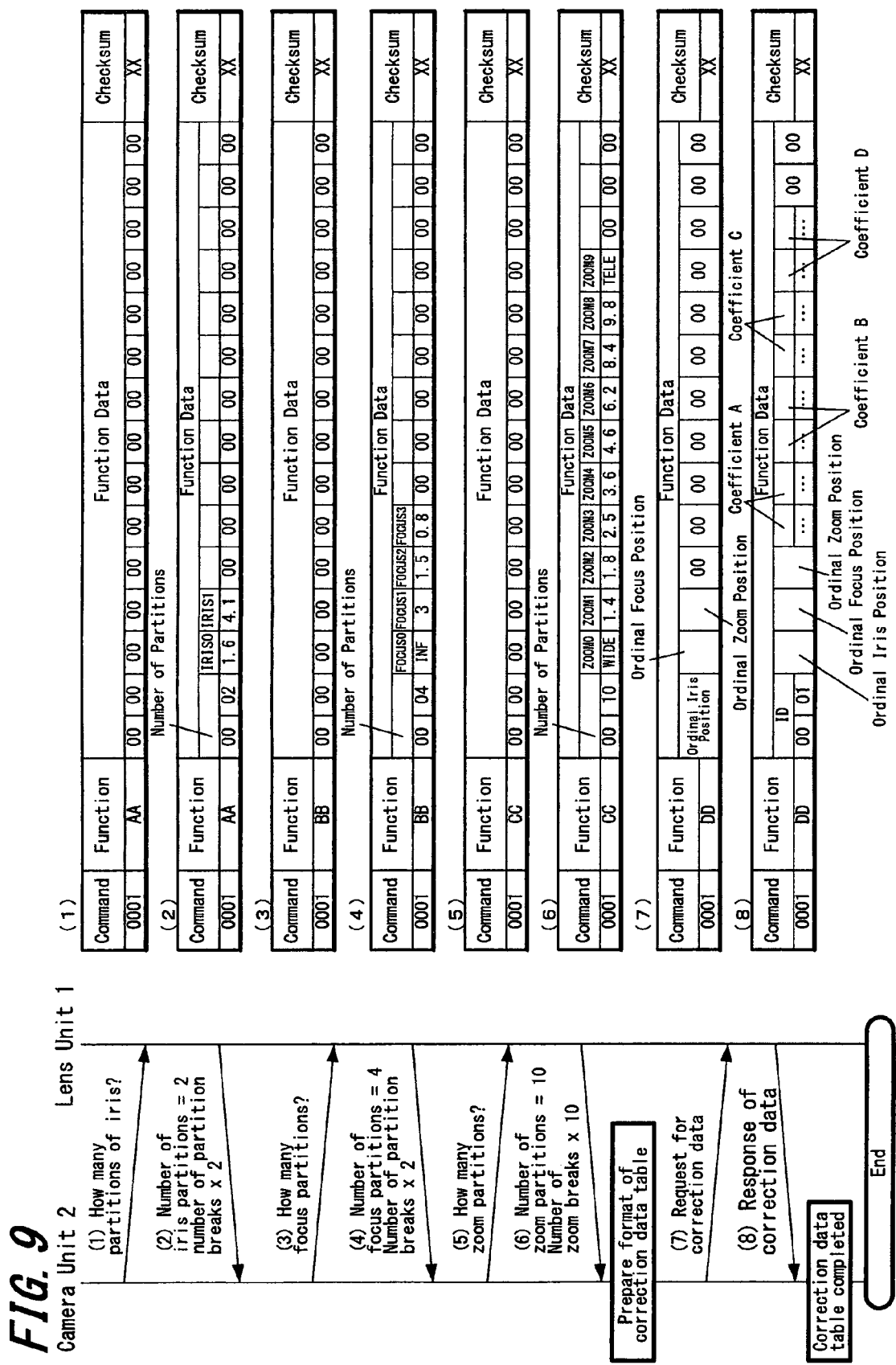
FIG. 9 is an explanatory diagram illustrating a process example for acquiring optical correction data during an initialization process according to an embodiment of the present invention.

FIG. 9 shows an exchange of data between the camera unit 2 and the lens unit 1 and an exemplified construction of the data to be transmitted and received. In this embodiment, the correction data for lateral chromatic aberration and light falloff at edges are used as the optical correction data. A coefficient for the correction of lateral chromatic aberration or light falloff at edges varies with the iris position, the focus position, and the zoom position. The number of sections of these positions varies with the kind of the lens. When the camera unit 2 reads an optical correction data table stored in the lens memory 17 of the lens unit 1, there is a need of obtaining the number of kinds of the iris position, the focus position, and zoom position (i.e., the number of partitions), respectively. In addition, it may be necessary to obtain on what kind of numerical value the partitions are bordered.

The value on the boundary between partitions is expressed by an actual value, that is, F number at a position represented by "full-aperture" or "F4" when, for example, there are two different kinds of iris position, "full-aperture" and "F4". Similarly, the focus position is represented by a focal distance, and the zoom position is represented by the magnification of the zoom setting.

FIG. 9 illustrates a process example when the lens unit 1 retains the table for the correction data for lateral chromatic aberration as shown in FIG. 6. According to the table exemplified in FIG. 6, there are two different iris positions, four different focus positions, and ten different zoom positions. First, the camera unit 2 inquires of the lens unit 1 about the number of types of the iris position, the focus position, and the zoom position in order and then forms the format of a correction data table based on a response from the lens unit 1. Then, after constructing the format of the correction data table, the camera unit 2 inquires about "ordinal iris position in a sequence", "ordinal focus position in a sequence", and "ordinal zoom position in a sequence" and obtains the responses thereof, thereby acquiring all correction data stored in the lens unit 1. Note that in this embodiment the case in which the camera unit 2 inquires of the lens unit 1 about the iris position, the focus position, and the zoom position in this order has been descried. However, any of other orders of inquiries may be employed.

An explanation will be given to the sequence shown on the left side in FIG. 9. First, the camera unit 2 transmits a command inquiring about the number of partitions of the iris position to the lens unit 1 (1). The command structure at this time is shown on the right side of a sequence diagram. "0001" is used as the command, for example. However, actually, it may use any of other numerical values which have not been assigned in reservation codes of "0001 to 1110". In this example, "AA" is the function used for an acquisition request for the number of partitions of the iris position, so that "AA" is described in the function. In addition, the function data is set to "0".

Upon receiving the command from the camera unit 2, the lens unit 1 responds to the number of partitions of the iris and the value on the boundary between the partitions (2). As described above, in the lens unit 1, the number of partitions is 2. Since the values on the boundaries between the partitions are 1.6 (the value of "full-aperture") and 4.1 (the value of F4), respectively, the information is described in the function data and transmitted to the camera unit 2. In this example, the number of partitions is described on the first two bytes (strictly the latter one of these two bytes) of the function data. The value of the boundary of the division is described on the third byte or later. Therefore, in the data transmitted from the lens unit 1 to the camera unit 2, the function is the same "AA" as that of the request command. On the first two bytes of the function data, the values of the partition boundaries are described on the second, third, and fourth bytes, which correspond to the numbers of partitions of the iris. The values of the partition boundaries are assigned sequentially from [0] in such a manner that they are assigned 1.6=IRIS [0], 4.1=IRIS [0], and so on in order.

Subsequent to acquiring the number of partitions and the number of partition boundaries of iris, the camera unit 2 requests both the number of partitions and the number of partition boundaries of the focus (3). If "BB" is used as the function when requiring the number of partitions of the focus, "BB" is placed in the function while there is nothing in the function data (i.e., "0") and then transmitted to the lens unit 1. On the other hand, the lens unit 1 responds to the camera unit 2 by describing "BB" in the function, "4" (the number of partitions) on the first two bytes of the function data, and the value of partition boundary on the third byte or later of the function data (4).

Subsequent to acquiring both the number of partitions and the number of partition boundaries of the focus, both the number of partitions and the number of partition boundaries of zoom setting are required (5). If "CC" is used as the function set when requiring the number of partitions of the zoom, "CC" is placed in the function while there is nothing in the function data (i.e., "0") and then transmitted to the lens unit 1. On the other hand, the lens unit 1 responds to the camera unit 2 by describing "CC" in the function, "10" (the number of partitions) on the first two bytes of the function data, and the value of partition boundary on the third byte or later of the function data (6).

As described above, when the number of partitions and the value of partition boundary of each of the iris position, the focus position, and the zoom position is acquired, the format of the optical correction data table is formed on the camera unit 2. If the format of the table is formed, then the optical correction data, which is the actual value stored in the table, is acquired.

If "DD" is used as a function when requiring the acquisition of the correction data for lateral chromatic aberration (R-G), "DD" is described in the function. Then, requested sequence of correction data is specified at the first 3 bytes of function data. The designation of the sequence is carried out in such a manner that the "ordinal iris position in a sequence", "ordinal focus position in a sequence", and "ordinal zoom position in a sequence" are described. The camera unit 2 transmits the request command as described above to the lens unit 1 (7).

Upon receiving a request command for acquiring the lateral chromatic aberration correction data transmitted from the camera unit 2, then the lens unit 1 reads out the lateral chromatic aberration correction data in a sequence designated in the command from the lens memory 17. The read data is transmitted to the camera unit 2 (8). In the first two bytes of the function data of the response data, ID, which represents the ordinal position of the response in a sequence, is described. The lens unit 1 in the present embodiment, there are two different iris positions, four different focus positions, and ten different zoom positions. Therefore, the exchange between the request command and the response thereof is carried out 80 times (2×4×10=80). Thus, numerical values from 1 to 80 are assigned to the response IDs in order. The lateral chromatic aberration correction data may require data in R-B in addition to the data in R-G. Therefore, also in R-B, the acquisition of correction data is carried out by the same procedures as those described above.

"DD" is described in the function of the response data and "1" is assigned as a response ID to the first two bytes of the function data. On the third byte to the fifth byte of the function data, sequence positions of the optical correction data are described. A value representing the ordinal iris position in a sequence is placed in the third byte. A value representing the ordinal focus position in a sequence is placed in the fourth byte. A value representing the ordinal zoom position in a sequence is placed in the fifth byte. A coefficient of the actual correction data is described on the sixth byte or later. Two bytes are used for representing one coefficient. If the correction data is represented by a polynomial cubic equation, then the first coefficient "A" is described on the sixth byte and the seventh byte, the next coefficient "B" is described on the eighth byte and the ninth byte, the next coefficient "C" is described on the tenth byte and the eleventh byte, and the last coefficient D is described on twelfth byte and the thirteenth byte.

It should be noted that specific numbers of bytes are used to describe the function data, A to D and the like; however, the numbers are not limited thereto, and other numbers of bytes may also be used.

The request and response of correction data is carried out the number of times corresponding to the result of the following multiplication: The number of partitions of the iris position×the number of partitions of the focus position×the number of partitions of the zoom position (in this embodiment, 80 times (2×4×10=80)). Thus, the optical correction data table stored in the lens memory 17 of the lens unit 1 is read out by the memory 24 of the camera unit 2. The procedures for acquiring the light falloff at edges correction data can also be performed in a manner similar to one described above.

Furthermore, if the camera unit 2 actually performs an optical correction, then coefficients based on the iris position, the focus position, and the zoom position are read from the optical correlation data table previously read in its memory 24, followed by carrying out correction using the read coefficient.

As described above, the lateral chromatic aberration correction data and the light falloff at edges correction data are stored in the lens unit 1 in advance. Then, the camera unit 2 reads the correction data tables stored in the lens unit 1 through communication. The camera unit 2 carries out optical correction based on the read correction data. Therefore, the optical correction can be carried out in conformity to the characteristics of the lens in the case where various kinds of interchangeable lens having different optical characteristics are used.

In addition, the optical correction data table is read into the memory 24 of the camera unit 2 from the lens unit 1 when an initialization communication is carried out between the lens unit 1 and the camera unit 2. Therefore, any required correction data can be read from the optical correction data table stored in the memory 24 at the time of performing an optical correction in the camera unit 2. Consequently, in the case of using an interchangeable lens, the correction can be carried out in real time while shooting a moving image.

The corrections of lateral chromatic aberration and light falloff at edges are designed to be carried out by image signal processing on the camera unit 2. Therefore, there is no need of using an expensive lens and the production costs can be reduced.

Furthermore, in the embodiment described above, the optical correction data stored in the lens unit 1 is acquired entirely as a data table when the video camera 100 is powered on, when the lens unit 1 is connected to the camera unit 2 for the first time, or when the lens unit 1 is replaced. Alternatively, in a normal communication process carried out between the camera unit 2 and the lens unit 1, the camera unit 2 may only acquire the required optical correction data from the lens unit 1. In this case, the acquisition of optical correction data by the camera unit 2 is carried out at timing of once a field. The process example of this case will be described with reference to the flowchart of FIG. 10 and the sequence diagram and the data configuration diagram of FIG. 11.

It should be noted that the above described timing is not limited to once a field, but may be once for two fields or other periods.

Figure 10:
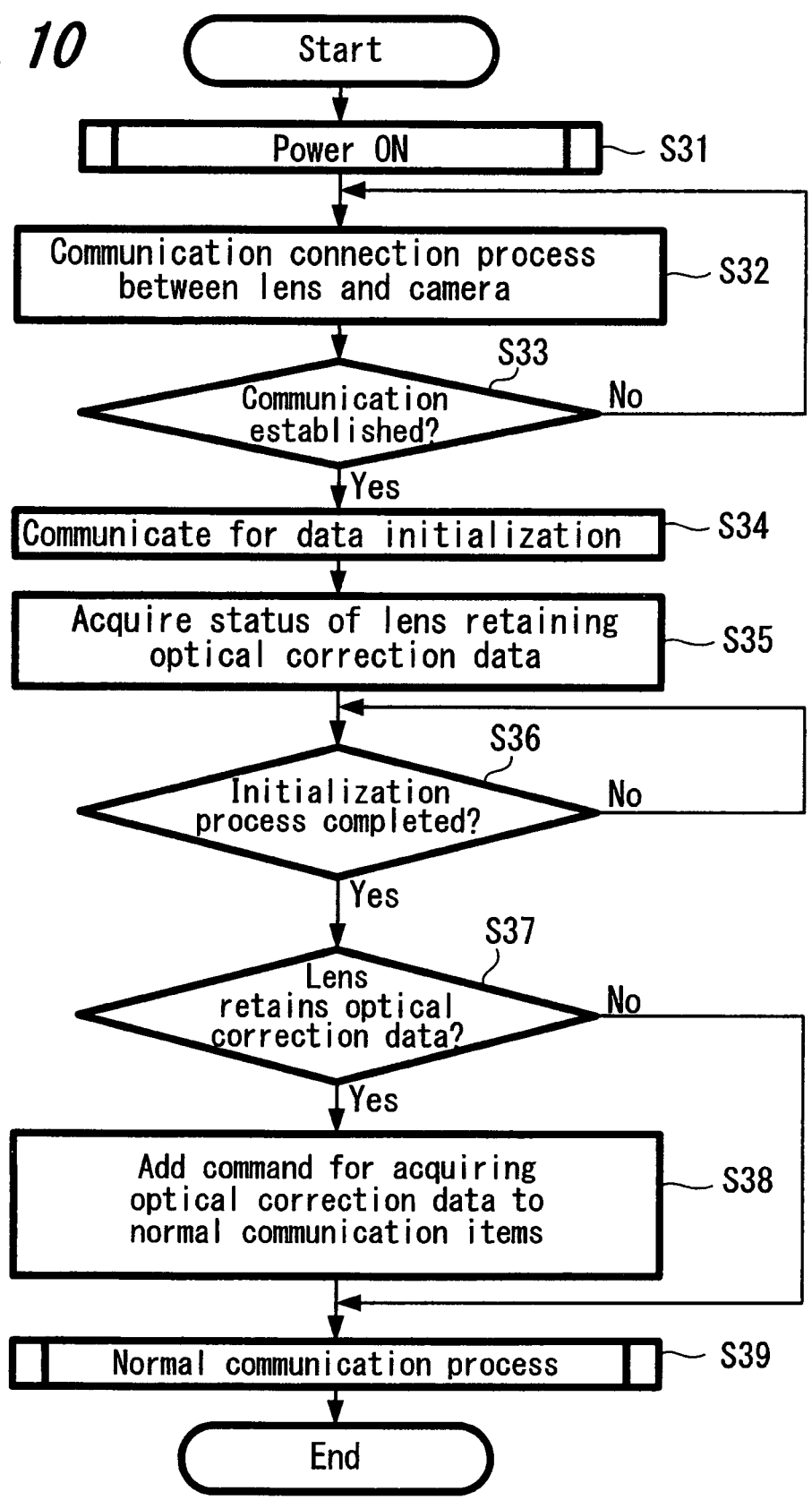
FIG. 10 is a flowchart illustrating a process example for periodically acquiring optical correction data according to another embodiment of the present invention.

In the flowchart of FIG. 10, first, when the video camera 100 is powered on (Step S31), the process of communication connection between the lens unit 1 and the camera unit 2 is carried out (Step S32). Subsequently, whether a communication between the lens unit 1 and the camera unit 2 is established by the process of communication connection is determined (Step S33). While no communication being established, the process of communication connection at Step S32 is carried out. When the establishment of the communication is determined, communication for data initialization is carried out between the lens unit 1 and the camera unit 2 (Step S34).

Next, in the communication for data initialization at Step S34, if the lens unit 1 acquires the status of the lens that retains optical correction data (Step S35), whether the initialization process is completed is determined (Step S36). The initialization process is successively carried out until it is determined that the initialization process is completed. If it is determined that the initialization process is completed, then it is determined whether the lens unit 1 is a lens retaining optical correction data on the basis of the status acquired in Step S35 (Step S37).

If it is determined that the lens unit 1 is a lens not retaining any optical correction data, the process proceeds to step S39 to carry out a normal communication process. If it is determined that the lens unit 1 is a lens that uses the optical correction data, then a command for requesting the acquisition of optical correction data is added to the normal communication items (Step S38), followed by carrying out the normal communication process (Step S39).

Figure 11:
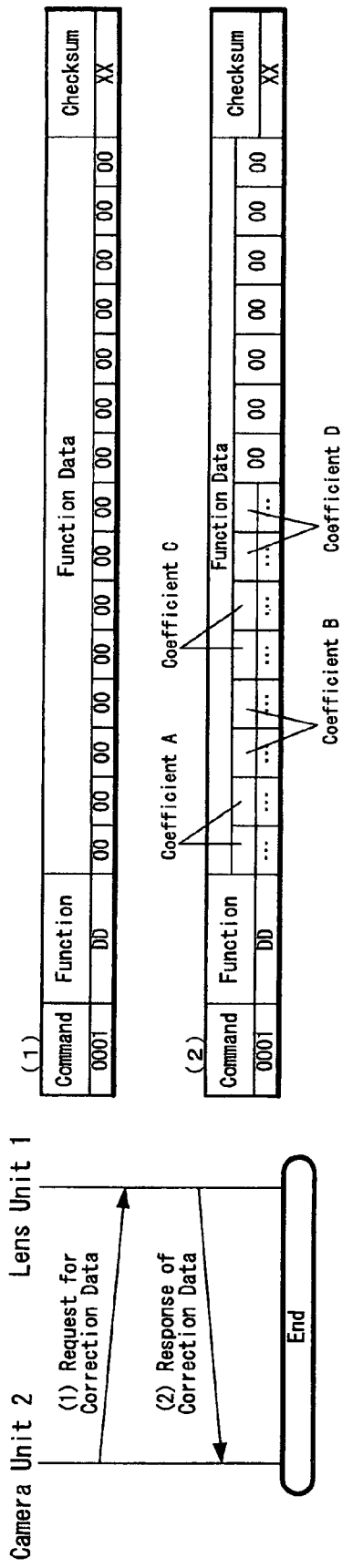
FIG. 11 is an explanatory diagram illustrating a process example for periodically acquiring optical correction data according to another embodiment of the present invention.

Next, at Step S38 of the flowchart of FIG. 10, the command added to the normal communication items and the response transmitted from the lens unit 1 to the camera unit 2 will be described in detail with reference to FIG. 11. FIG. 11 illustrates a process example at the time of acquiring the lateral chromatic aberration correction data. First, a command, which requires lateral chromatic aberration correction data transmission, is transmitted from the camera unit 2 to the lens unit 1 (1). At this time, "DD", which means an acquisition request for lateral chromatic aberration correction data (R-G), is described in the function of the data transmitted to the lens unit 1, so that the function data is set to "0".

The lens unit 1, which has received the command from the camera unit 2, makes a determination about the iris position, the focus position, and the zoom position at that time and then reads out the corresponding correction data from the lens memory 17, followed by responding to the camera unit 2 (2). "DD" is described in the function of the response data. The coefficient of the lateral chromatic aberration correction data is described on the function data. Two bytes are used for representing one coefficient. If the correction data is represented by a polynomial cubic equation, then the first coefficient "A" is described on the first byte and the second byte, the next coefficient "B" is described on the third byte and the fourth byte, the next coefficient "C" is described on the fifth byte and the sixth byte, and the last coefficient D is described on the seventh byte and the eighth byte.

It should be noted that specific numbers of bytes are used to describe the function data, A to D and the like; however, the numbers are not limited thereto, and other numbers of bytes may also be used.

Thus, every time the optical correction is carried out on the camera unit 2, the lens memory 17 of the lens unit 1 is requested to transmit optical correction data and a correction is carried out on the camera unit 2 using a coefficient contained in the response data from the lens memory 17 of the lens 1. Thus, the optical correction can be carried out in real time while shooting a moving image.

Although the aforementioned embodiment has described the example applied to the video camera, not limited thereto. Any of other apparatus or the like having the same functions as those of the video camera may be employed, thereby being applicable to various kinds of the apparatuses.

Although the aforementioned embodiment stores optical correction data for each kind of lens. Alternatively, the optical correction data based on the individual difference of the lens may be stored.

Further, in the above described embodiments, description is given to the two kinds of correction, that is, the correction of lateral chromatic aberration and the correction of light falloff at edges. However, it should be appreciated that one of them alone may be corrected.

It should be understood by those skilled in the art that various modifications, combinations, sub-combinations and alterations may occur depending on design requirements and other factors insofar as they are within the scope of the appended claims or the equivalents thereof.

The invention claimed is:

1. A lens apparatus having a lens, which is detachably mounted on an image capture apparatus, comprising:
   a lens-information storage unit configured to store correction information for light falloff at edges, which are characteristic information about aberration of the lens;
   a communication unit configured to communicate with the image capture apparatus; and
   a control unit configured to carry out control of transmitting the correction information for light falloff at edges stored in the lens-information storage unit to the image capture apparatus through the communication unit upon receiving an instruction from the image capture apparatus through the communication unit, the transmitting being periodic,
   the correction information for light falloff at edges comprises a three-dimensional array including a plurality of zoom positions, a plurality of focus positions, and a plurality of iris positions of the lens and, for each combination of zoom position, focus position and iris position, a plurality of coefficients corresponding to a polynomial equation that describes the light falloff at edges,
   wherein the image capture apparatus is operable to transmit a command to the lens apparatus for purposes of inquiring about a flag indicating whether or not the lens apparatus retains the correction information, and wherein when the image capture apparatus receives no response from the lens apparatus in reply to transmission of the command, it is determined that the lens apparatus does not retain the correction information,
   wherein upon receiving the instruction from the image capture apparatus, the lens apparatus makes a determination about the iris position, focus position and zoom position of the lens at the time of receiving the instruction, reads out the correction information for light falloff at edges corresponding to the determined iris position, focus position and zoom position, and transmits the read-out information to the image capture apparatus, such that the correction information for light falloff at edges received by the image capture apparatus in reply to the instruction includes only the correction information for light falloff at edges corresponding to the determined iris position, focus position and zoom position, and
   wherein the correction information for light falloff at edges is difference data which adjusts for the difference between light falloff at edges corresponding to the lens and light falloff at edges corresponding to another lens.

2. An image capture apparatus on which a lens apparatus is detachably mounted, comprising:
   an image capture device configured to generate an image signal obtained by photoelectric conversion of subject light forming an image through a lens of the lens apparatus;
   an image-signal processor configured to carry out image processing on the image signal photo-electrically converted by the image capture device;
   a communication unit configured to communicate with the lens apparatus; and
   a control unit configured to carry out control of receiving, through the communication unit, correction information for light falloff at edges, which are characteristic information about aberration of the lens and stored in the lens apparatus the receiving being periodic,
   wherein the image-signal processor corrects image degradation caused by the aberration of the lens using the correction information for light falloff at edges, which are received through the communication unit,
   the correction information for light falloff at edges comprises a three-dimensional array including a plurality of zoom positions, a plurality of focus positions, and a plurality of iris positions of the lens and, for each combination of zoom position, focus position and iris position, a plurality of coefficients corresponding to a polynomial equation that describes the light falloff at edges,
   wherein the image capture apparatus is operable to transmit a command to the lens apparatus for purposes of inquiring about a flag indicating whether or not the lens apparatus retains the correction information, and wherein when the image capture apparatus receives no response from the lens apparatus in reply to transmission of the command, it is determined that the lens apparatus does not retain the correction information,
   wherein upon receiving an instruction from the image capture apparatus, the lens apparatus makes a determination about the iris position, focus position and zoom position of the lens at the time of receiving the instruction, reads out the correction information for light falloff at edges corresponding to the determined iris position, focus position and zoom position, and transmits the read-out information to the image capture apparatus, such that the correction information for light falloff at edges received by the image capture apparatus in reply to the instruction includes only the correction information for light falloff at edges corresponding to the determined iris position, focus position and zoom position, and
   wherein the correction information for light falloff at edges is difference data which adjusts for the difference between light falloff at edges corresponding to the lens and light falloff at edges corresponding to another lens.

3. An image capture apparatus according to claim 2, wherein the correction information for light falloff at edges stored in the lens apparatus are received through an initialization process carried out between the lens apparatus and the image capture apparatus upon turning on the image capture apparatus, upon connecting the lens apparatus to the image capture apparatus for the first time, or upon replacing the lens apparatus.

4. An image capture apparatus on which a lens apparatus is detachably mounted, comprising:
   an image capture device configured to generate an image signal obtained by photoelectric conversion of subject light forming an image through a lens of the lens apparatus;
   an image-signal processor configured to carry out image processing on the image signal photo-electrically converted by the image capture device;
   a communication unit configured to communicate with the lens apparatus; and
   of obtaining correction information for light falloff at edges, which are characteristic information about aberration of the lens and stored in the lens apparatus, determined for the lens periodically, wherein
   the image-signal processor corrects image degradation caused by the aberration of the lens using the correction information for light falloff at edges determined for the lens periodically and obtained through the control by the control unit,
   the correction information for light falloff at edges comprises a three-dimensional array including a plurality of zoom positions, a plurality of focus positions, and a plurality of iris positions of the lens and, for each combination of zoom position, focus position and iris position, a plurality of coefficients corresponding to a polynomial equation that describes the light falloff at edges, wherein the image capture apparatus is operable to transmit a command to the lens apparatus for purposes of inquiring about a flag indicating whether or not the lens apparatus retains the correction information, and wherein when the image capture apparatus receives no response from the lens apparatus in reply to transmission of the command, it is determined that the lens apparatus does not retain the correction information, wherein upon receiving an instruction from the image capture apparatus, the lens apparatus makes a determination about the iris position, focus position and zoom position of the lens at the time of receiving the instruction, reads out the correction information for light falloff at edges corresponding to the determined iris position, focus position and zoom position, and transmits the read-out information to the image capture apparatus, such that the correction information for light falloff at edges received by the image capture apparatus in reply to the instruction includes only the correction information for light falloff at edges corresponding to the determined iris position, focus position and zoom position, and wherein the correction information for light falloff at edges is difference data which adjusts for the difference between light falloff at edges corresponding to the lens and light falloff at edges corresponding to another lens.

5. An image capture apparatus according to claim 4, wherein the correction information for light falloff at edges, which are stored in the lens apparatus, are transmitted to the image capture apparatus by periodical communication between the lens apparatus and the image capture apparatus through the communication unit.

6. An image capture apparatus, comprising:

an image capture device configured to generate an image signal obtained by photoelectric conversion of subject light forming an image through a lens;

a lens-information storage unit configured to store correction information for light falloff at edges, which are characteristic information about aberration of the lens;

an image-signal processor configured to carry out image processing on the image signal photo-electrically converted by the image capture device;

a communication unit configured to carry out communication with the lens-information storage unit;

of receiving the correction information for light falloff at edges, which are stored in the lens-information storage unit, through the communication unit the receiving being periodic, wherein the image-signal processor corrects image degradation caused by the aberration of the lens using the correction information for light falloff at edges, which are received through the communication unit, the correction information for light falloff at edges comprises a three-dimensional array including a plurality of zoom positions, a plurality of focus positions, and a plurality of iris positions of the lens and, for each combination of zoom position, focus position and iris position, a plurality of coefficients corresponding to a polynomial equation that describes the light falloff at edges, wherein the image capture apparatus is operable to transmit a command to a lens apparatus for purposes of inquiring about a flag indicating whether or not the lens-information storage unit retains the correction information, and wherein when the image capture apparatus receives no response from the lens apparatus in reply to transmission of the command, it is determined that the lens-information storage unit does not retain the correction information, wherein upon receiving an instruction from the image capture apparatus, the lens apparatus makes a determination about the iris position, focus position and zoom position of the lens at the time of receiving the instruction, reads out the correction information for light falloff at edges corresponding to the determined iris position, focus position and zoom position, and transmits the read-out information to the image capture apparatus, such that the correction information for light falloff at edges received by the image capture apparatus in reply to the instruction includes only the correction information for light falloff at edges corresponding to the determined iris position, focus position and zoom position, and wherein the correction information for light falloff at edges is difference data which adjusts for the difference between light falloff at edges corresponding to the lens and light falloff at edges corresponding to another lens.

7. An image capture apparatus, comprising:

an image capture device configured to generate an image signal obtained by photoelectric conversion of subject light forming an image through a lens;

a lens-information storage unit configured to store correction information for light falloff at edges, which are characteristic information about aberration of the lens;

an image-signal processor configured to carry out image processing on the image signal photo-electrically converted by the image capture device;

a communication unit configured to carry out communication with the lens-information storage unit; and a control unit configured to carry out control of obtaining the correction information for light falloff at edges, which are stored in the lens-information storage unit, determined for the lens periodically, wherein the image-signal processor corrects image degradation caused by the aberration of the lens using the correction information for lateral chromatic aberration and/or the correction information for light falloff at edges determined for the lens periodically and obtained through the control of the control unit, the correction information for light falloff at edges comprises a three-dimensional array including a plurality of zoom positions, a plurality of focus positions, and a plurality of iris positions of the lens and, for each combination of zoom position, focus position and iris position, a plurality of coefficients corresponding to a polynomial equation that describes the light falloff at edges, wherein the image capture apparatus is operable to transmit a command to a lens apparatus for purposes of inquiring about a flag indicating whether or not the lens-information storage unit retains the correction information, and wherein when the image capture apparatus receives no response from the lens apparatus in reply to transmission of the command, it is determined that the lens-information storage unit does not retain the correction information, wherein upon receiving an instruction from the image capture apparatus, the lens apparatus makes a determination about the iris position, focus position and zoom position of the lens at the time of receiving the instruction, reads out the correction information for light falloff at edges corresponding to the determined iris position, focus position and zoom position, and transmits the read-out information to the image capture apparatus, such that the correction information for light falloff at edges received by the image capture apparatus in reply to the instruction includes only the correction information for light falloff at edges corresponding to the determined iris position, focus position and zoom position, and wherein the correction information for light falloff at edges is difference data which adjusts for the difference between light falloff at edges corresponding to the lens and light falloff at edges corresponding to another lens.

8. A method for correcting image degradation caused by aberration of a lens mounted on an image capture apparatus, comprising:

storing correction information for light falloff at edges, which are characteristic information about the aberration of the lens, in a lens apparatus including the lens;

reading the correction information for light falloff at edges, which are stored in the lens apparatus, determined for the lens periodically; and using the correction information read out to correct the image degradation caused by the aberration of the lens, the correction information for light falloff at edges comprises a three-dimensional array including a plurality of zoom positions, a plurality of focus positions, and a plurality of iris positions of the lens and, for each combination of zoom position, focus position and iris position, a plurality of coefficients corresponding to a polynomial equation that describes the light falloff at edges, wherein the image capture apparatus is operable to transmit a command to the lens apparatus for purposes of inquiring about a flag indicating whether or not the lens apparatus retains the correction information, and wherein when the image capture apparatus receives no response from the lens apparatus in reply to transmission of the command, it is determined that the lens apparatus does not retain the correction information, wherein upon receiving an instruction from the image capture apparatus, the lens apparatus makes a determination about the iris position, focus position and zoom position of the lens at the time of receiving the instruction, reads out the correction information for light falloff at edges corresponding to the determined iris position, focus position and zoom position, and transmits the read-out information to the image capture apparatus, such that the correction information for light falloff at edges received by the image capture apparatus in reply to the instruction includes only the correction information for light falloff at edges corresponding to the determined iris position, focus position and zoom position, and wherein the correction information for light falloff at edges is difference data which adjusts for the difference between light falloff at edges corresponding to the lens and light falloff at edges corresponding to another lens.

* * * * *